LOOP TAPE TRANSPORT MECHANISM

Filed May 2, 1966

INVENTORS:
RICHARD S. TVETER
SYDNEY HIMMELSTEIN

BY: Dawson, Tilton, Fallon, Lungmus & Alexander
ATT'YS

LOOP TAPE TRANSPORT MECHANISM

INVENTORS:
RICHARD S. TVETER
SYDNEY HIMMELSTEIN
BY: Dawson, Tilton, Fallon, Lungmus & Alexander
ATT'YS INVENTORS:
RICHARD S. TVETER
SYDNEY HIMMELSTEIN
BY: Dawson, Tilton, Fallon, Lungmus & Alexander
ATT'YS INVENTORS.
RICHARD S. TVETER
SYDNEY HIMMELSTEIN
BY: Dawson, Tilton, Fallon, Lungmus & Alexander
ATT'YS INVENTORS:
RICHARD S. TVETER
SYDNEY HIMMELSTEIN
BY: Dawson, Tilton, Fallon, Lungmus & Alexander
ATT'YS INVENTORS:
RICHARD S. TVETER
SYDNEY HIMMELSTEIN
BY: Dawson, Tilton, Fallon, Lungmus & Alexander
ATT'YS United States Patent Office 3,441,187
Patented Apr. 29, 1969

3,441,187

LOOP TAPE TRANSPORT MECHANISM

Richard S. Tveter, Glenview, Ill., and Sydney Himmelstein, 7710 Sheridan Road, Chicago, Ill. 60626; said Tveter assignor to said Himmelstein Filed May 2, 1966, Ser. No. 546,627
Int. Cl. B65h *17/28, 23/08, 23/04*
U.S. Cl. 226—95 6 Claims

ABSTRACT OF THE DISCLOSURE

A tape transport mechanism wherein a looped tape is continuously fed past a transducer to provide an output signal. The transport mechanism includes porous tape translating means and porous tape retarding means. A vacuum pump provides a fluid pressure differential across the porous means to provide coordinated translating and retarding forces controlling the tension in the tape as it is transported past the transducer.

This invention relates to a loop tape transport mechanism and, more particularly, to tape that is arranged in the form of endless loop and which is scanned by sensing heads while the endless tape is uniquely controlled.

The invention makes possible operation of an endless tape at high speed—higher than previously was attainable and with a degree of accuracy also heretofore unavailable to the art. The provision of such a mechanism constitutes an important object of the invention.

The use of an endless tape operated at significant speeds and under advantageous control can provide the number of desirable use. One, for example, is to detect signals buried in noise. Most techniques for detecting signals masked by noise depend on narrow band filtering techniques. When the noise is random—has uniform spectral density—the presence of a signal will increase the energy at the frequency of the signal and, as the result, the presence of the signal can be detected and its spectral components measured. If the noise-obscured data is recorded on a tape loop and played back continuously, it can be made periodic at the loop rate. Further, because the background noise is random—has uniform spectral density—repeating it does not alter it, i.e., it remains random. Therefore it is possible to locate non-periodic signals made periodic with a tape loop by conventional analysis methods. The instant invention provides a tape handling or transport mechanism that makes this desirable detection possible.

Another object of the invention is to provide an arrangement of drive elements such as to establish a unique tensioning of the tape and further to operate against the back side of the tape so as to eliminate contact with the oxide surface.

Other objects and advantages of the invention may be seen in the details of construction and operation set down in the following specifications.

The invention is explained in conjunction with an illustrative embodiment in the accompanying drawing, in which—

Figure 9:
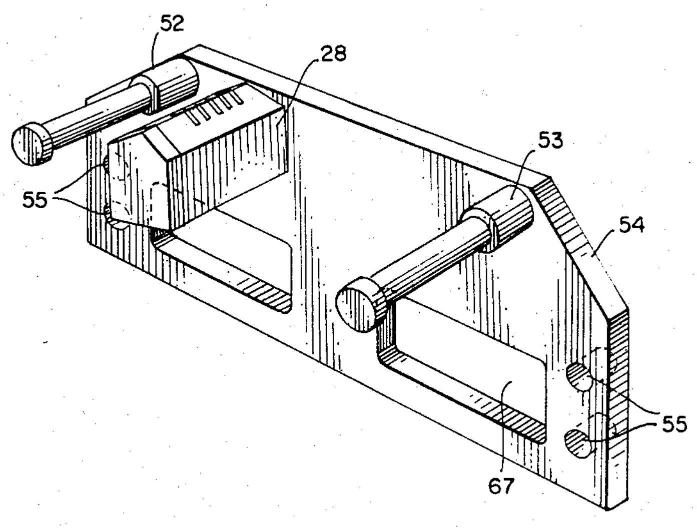
FIG. 9 is a perspective view of the recording head and its associated mounting seen in the lower central portion of FIG. 3.
Figures 10, 11:
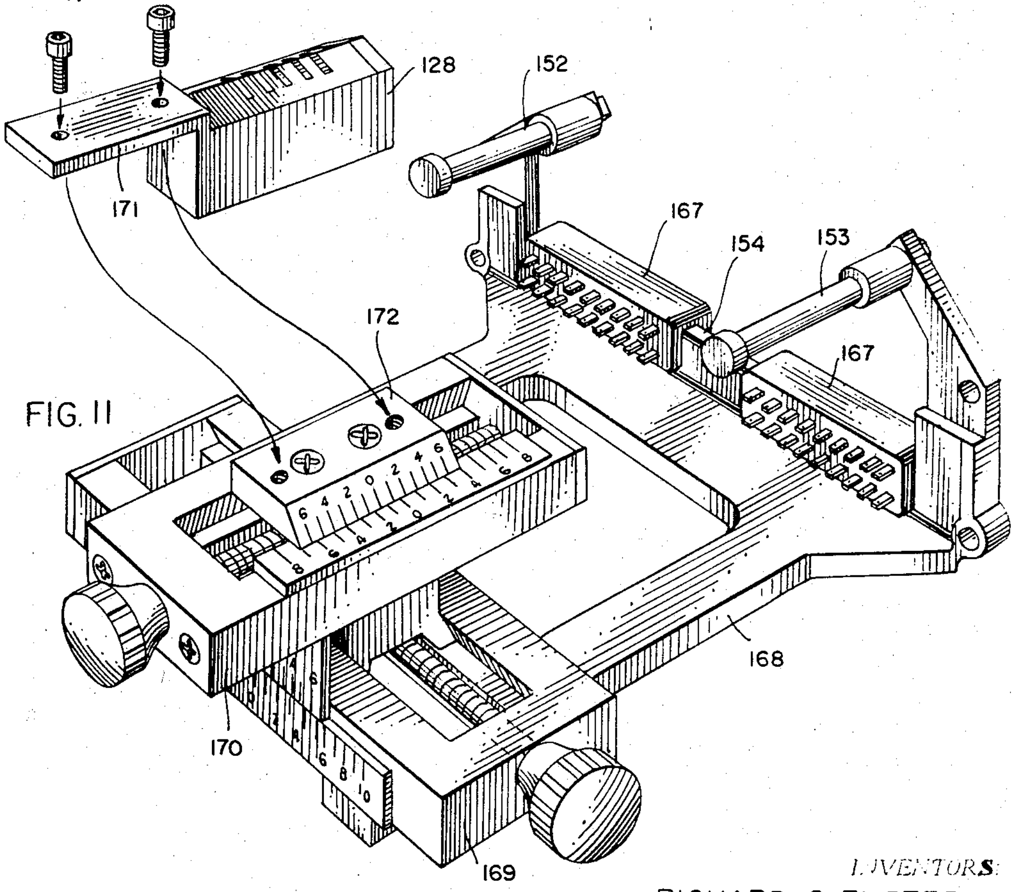
Figure 12:
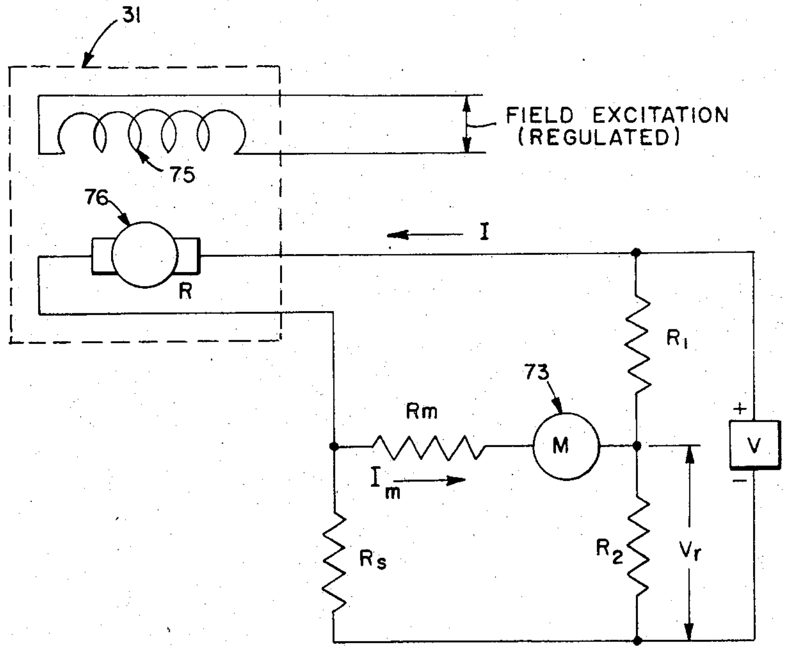

FIGS. 10 and 11 constitute an exploded view of an alternative form of recording head and mounting means for use in substitution for that seen in FIG. 9 and which show features useful in vernier adjustment of the recording head location; and FIG. 12 is a schematic wiring diagram of a portion of the electrical circuitry associated with the apparatus depicted in the preceding drawing views.

Figure 1:
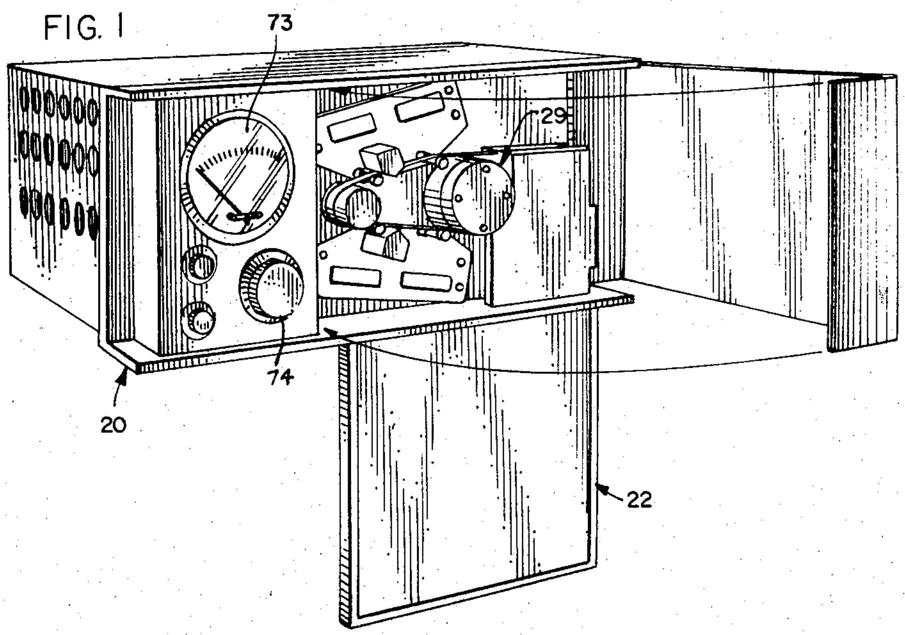
FIG. 1 is a perspective elevational view of a unit incorporating teachings of the invention.
Figure 3:
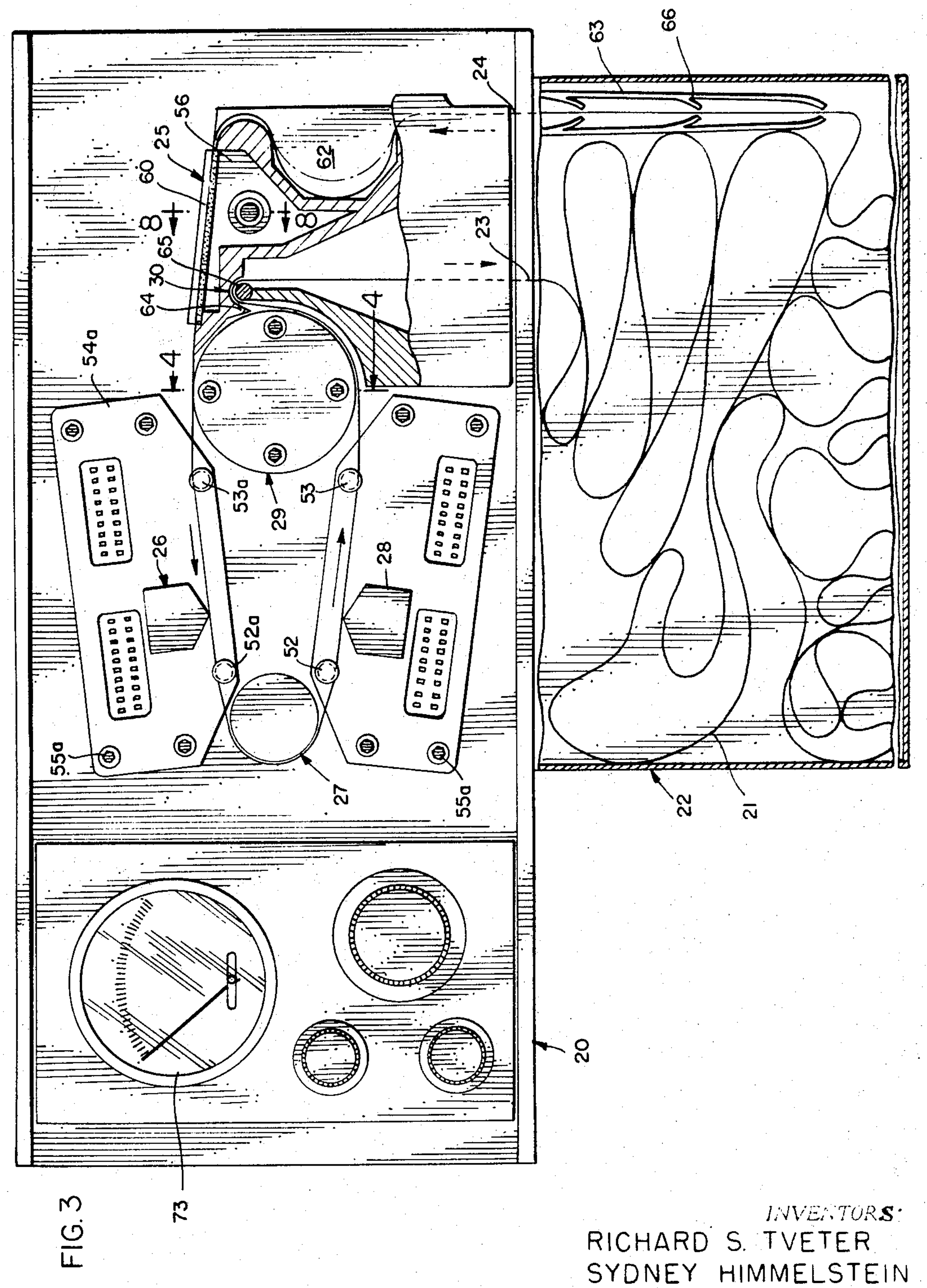
FIG. 3 is a front elevational view of the apparatus of FIGS. 1 and 2 such as would be seen along the sight line 3—3 applied to FIG. 2, FIG. 3 also showing certain components in section.

The invention can be best approached through a comparison of FIGS. 1 and 3. In each view the numeral 20 designates generally a rectangular housing which carries the various components needed for scanning an endless loop tape. The tape itself is designated by the number 21 (seen only in FIG. 3) and is seen to be confined within a very narrow depending housing or enclosure generally designated 22 which is removably attached by means not shown to the bottom of the housing 20. The enclosure 22 serves as a storage reservoir for the tape 21 having the endless loop tape entering the enclosure 22 as at 23 and exiting therefrom as at 24.

Still referring to FIG. 3, the tape proceeding from the location designated 24 passes through a tensioning station generally designated 25, past a scanning head generally designated 26, about an idler roller generally designated 27, past a second scanning head generally designated 28, about a transport capstan generally designated 29, through an exit station generally designated 30, from whence it returns to the position previously referred to as the entrance 23.

Figure 2:
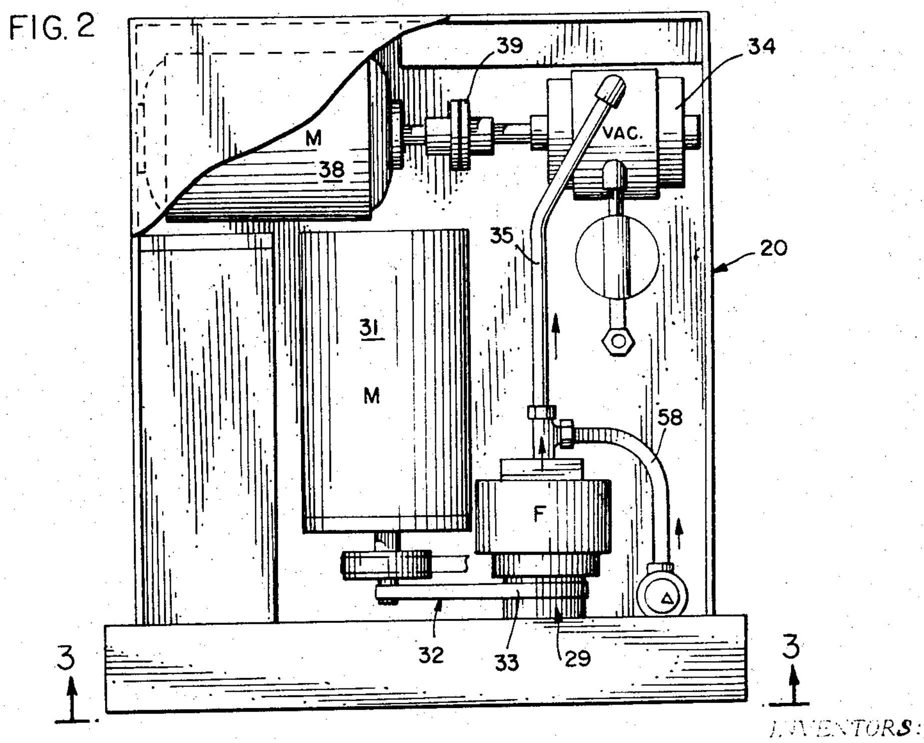
FIG. 2 is a top plan view of the apparatus of FIG. 1, partially broken away to reveal the interior working elements.
Figure 4:
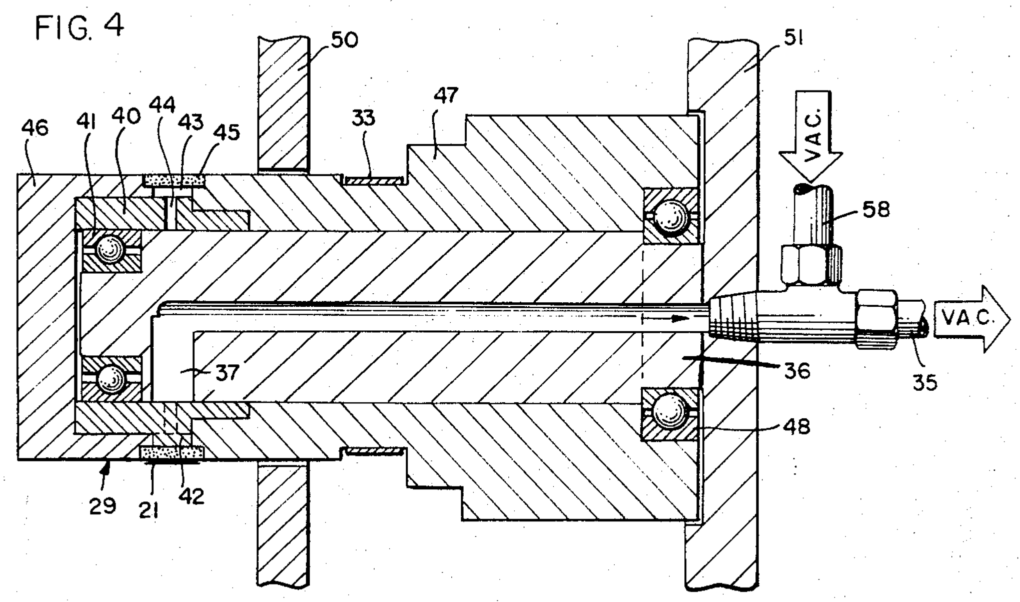
FIG. 4 is an enlarged fragmentary sectional view taken along the line 4—4 of FIG. 3.

One of the basic features of the apparatus is the previously-mentioned transport capstan 29 which is seen to be rather centrally located in FIG. 1 and also appears in the lower righthand corner of FIG. 2. The capstan 29 provides the power that advances the tape 21 and for this purpose a motor 31 is mounted within the housing 20 (see FIG. 2). The motor 31 is equipped with an output drive generally designated 32 (see FIG. 2) which drives the capstan, the belt portion 33 also being designated in FIG. 4.

As can be appreciated from FIG. 3, the tape 21 is wrapped, i.e., travels with, a quadrant of the capstan 29. In FIG. 3 this is seen to be the lower righthand quadrant. For the purpose of causing the tape 21 to travel with the quadrant of the capstan 29, a vacuum system is provided which includes a vacuum pump 34 (see FIG. 2) which is coupled by means of a conduit 35 to an axle 36 (see FIG. 4). The capstan 29 is journaled on the axle 36 and it will be noted from a comparison of FIGS. 4 and 6 that the axle 36 is equipped with a 90° cutout zone as at 37 for the purpose of communicating the vacuum pump 34 with the capstan 29—thereby to cause atmospheric pressure to urge the tape 21 against a 90° segment of the capstan periphery. The vacuum pump 34 is operated by a motor 38 (see FIG. 2) direct coupled as at 39 to the pump 34.

The capstan 29 includes an annular cylindrical housing as at 40 (see FIG. 4) which is journaled on the axle 36 through a circular roller bearing 41. The cylindrical housing 40 is characterized by a plurality of axially-extending ribs 42 which provide therebetween spaces 43 so as to communicate the interior of the cylindrical casing 40 with the exterior. For this purpose there are further communicating passages as at 44. Superposed on the axially-extending ribs 42 is a porous center band as at 45 against which the tape 21 is urged by virtue of a vacuum condition existing within the zonal quadrant 37. The centered band 45 is maintained in position by additional components 46 and 47 of the capstan. The component 46 is a cap which clamps the outer side of the center band 45 against the flywheel component 47 of the capstan 29. A bearing 48 is provided between the component 47 and the axle 36. The cap 46 is secured in place by means of screws 49 (see FIG. 5). A wall 50 compare FIGS. 4 and 5) is provided to isolate the outer projection of the capstan 29 from the flywheel portion 47, i.e., to mask the belt 33 and associated components. A rear wall 51 provides the support for the axle 36.

Figures 5, 6:
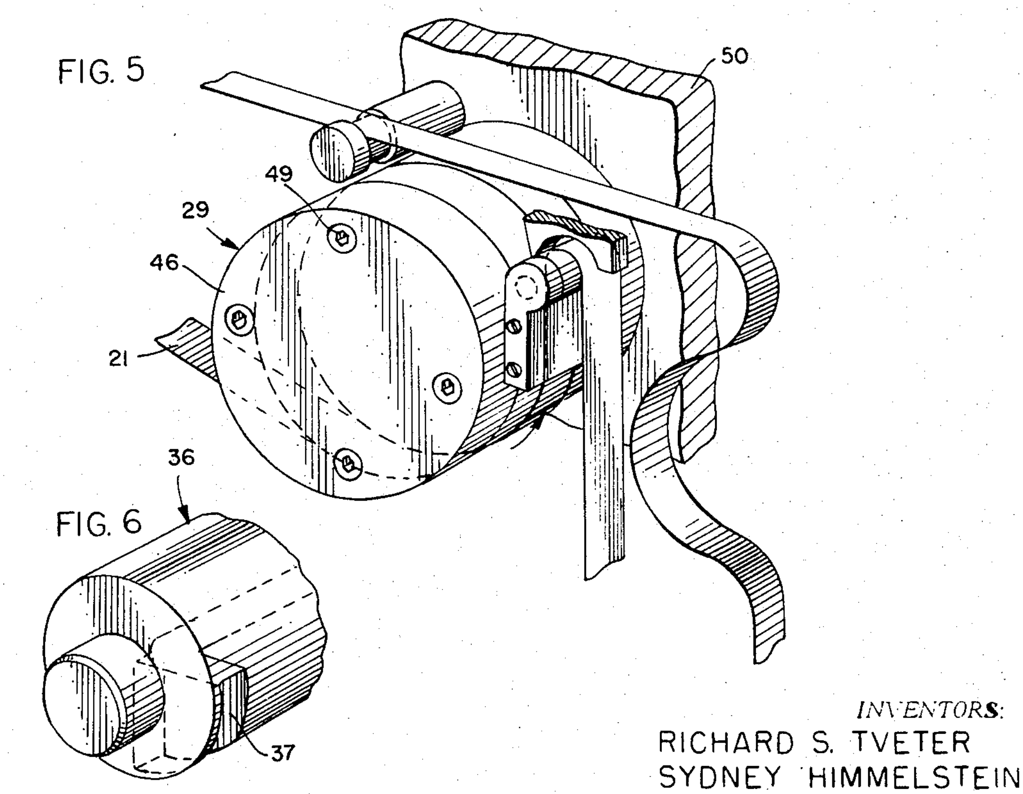
FIG. 5 is a perspective detail of the capstan portion of FIG. 3 and which is seen in sectional view in FIG. 4.
FIG. 6 is a perspective detail drawing in fragmentary part of the inner nose portion of the capstan of FIGS. 4 and 5.

Prior to the time the tape 21 engages the lower right-hand quadrant of the capstan 29 (as seen in FIG. 5), it passes under removably mounted guide posts 52 and 53 (see the central portion of FIG. 3). The guide posts 52 and 53 are provided as a part of the recording head frame as can be appreciated from a consideration of FIG. 9. In FIG. 9, a plate 54 is arranged for securement to the wall 50 by means of screws 55*a* (as seen in FIG. 3) extending through openings 55 and the frame 54 has rigidly affixed thereto the recording head 28. A like structure is provided at 54*a* relative to the head 26 and the structure 54*a* also includes guide posts or rollers 52*a* and 53*a*. The above-mentioned posts are sized for the particular tape being transported.

Figure 7:
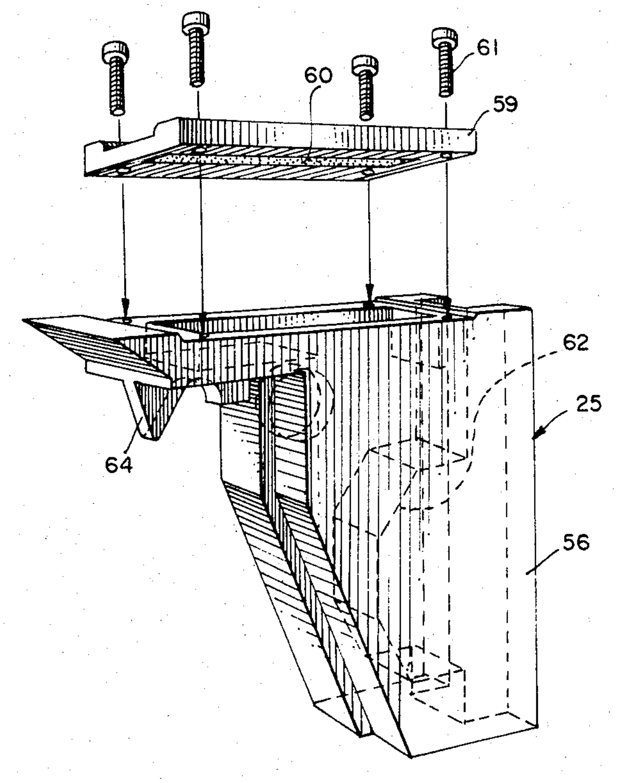
FIG. 7 is an exploded fragmentary perspective view of a portion of FIG. 3, i.e., the portion seen in the area of FIG. 3 equipped with the sight line designations 8—8.

From the foregoing it is seen that one aspect of the tensioned control is provided by the capstan 29 and following is a description of the tensioning pad generally designated 25 which controls the tension as the tape 21 enters the scanning zone. The tensioning pad assembly 25 includes a block-like element 56 (see FIGS. 7 and 8). The housing or block 56 is secured to the wall 50 and has an interior chamber as at 57 (see FIG. 8) which is coupled to the vacuum pump 34 by means of a conduit 58 (see also FIG. 2). The upper side of the chamber 57 is closed by a plate 59 which carries a porous centered pad 60—permitting the flow of air from atmosphere into the chamber 57. The pad or cover 59 is seen in exploded view in FIG. 7 and is secured to block 56 by means of screws 61.

From a consideration of FIG. 3 it will be seen that the tape 21 passes over the pad 60 and is urged thereagainst by atmospheric pressure. Prior to the tape coming into engagement with the pad 60 it passes up the right side of the block 56 which is partially hollowed out as at 62 to provide an accumulation space for slack tape, the purpose of which will be explained in conjunction with a straightening device or "unsnagger" 63 (see FIG. 3).

Figure 8:
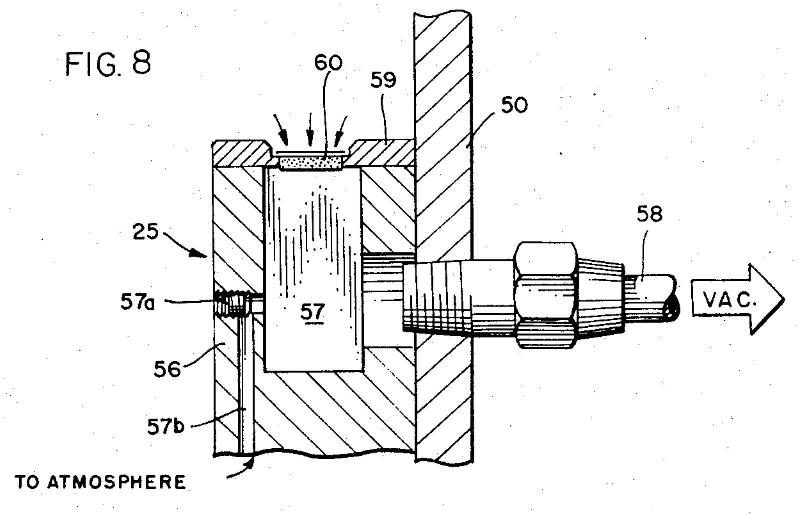
FIG. 8 is an enlarged sectional view in fragmentary form taken along the line 8—8 of FIG. 3 and thus above the apparatus portion also seen in FIG. 7.

The vacuum in chamber 57, used for tensioning the tape at pad 60, may be varied by adjusting a valve 57*a* shown in FIG. 8. Adjustment of the valve bleeds some air into vacuum chamber 57 via port 57*b*, thus adjusting the vacuum with a resultant effect on tape tension.

On its left side, the block 56 is equipped with a depending projection 64 (see particularly FIGS. 3 and 7) which coacts with a post 65 for buffering the tape 21 in its return to the entrance 23 of the enclosure 22.

In the closure 22, the tape is stored in either a gravity loop or in a random storage cartridge. If the gravity loop is employed, the enclosure 22 may be omitted—the gravity loop being a free-hanging loop of tape below the transport mechanism. The length of this loop may be varied to suit the requirements of the total loop length. As longer loop lengths may be required, in some cases, than the amount of free space available below the transport, the tape may be stored in a random storage cartridge or enclosure as seen at 22. For the purpose of withdrawing the tape in a uniform, unsnagged fashion from its random storage container, the unsnagging device 63 is employed which includes an elongated member having a plurality of integral prong-like projections as at 66 for the purpose of straightening out whatever snarls may be in the tape. Such straightening may occasion a slight delay in advancement of the tape whereupon tape temporarily slack in the recess 62 may be utilized to provide a continuous, uniform speed transmission.

In certain cases it may be advantageous to be able to move the heads 28 and 26. Bi-axial movement is achieved by substituting the mechanism seen in FIGS. 10 and 11 for the assembly seen in FIG. 9. In FIG. 10 the basic frame is designated by the number 154 and again is equipped with posts or rollers 152 and 153 substantially in the fashion seen in FIG. 9. The numeral 16 designates terminal connectors which are utilized in the electrical circuitry. Differing from the showing in FIG. 9 is the showing in FIG. 11 of a projecting flange part 168 from the frame 154 so as to support a pair of venier gauges as at 169 and 170 for moving the sensing head 128 to the right or left or in or out, respectively, as the case may be. For this purpose, the head 128 is secured to a bracket 171 which in turn is suitably anchored to the movable portion of the vernier gauge 170 as at 172.

It will be appreciated that posts or rollers such as those at 52 and 53 and the centered pads are readily replaceable so as to accommodate tapes of different widths—also a plurality of tapes so as to utilize a plurality of heads as at 26 and 28.

The capstan motor 31 (see FIG. 2) through the pulley ratios and belt drive, controls the velocity of the tape through the transport mechanism. In one embodiment of this invention the capstan motor 31 is a shunt wound D.C. motor. The motor 31 is controlled so that its speed (and thus the tape velocity) is infinitely variable. Special sensing circuits sense the motor speed and display this speed on a meter 73 mounted on the front face of the transport. The means for controlling capstan speed is the control knob 74 (see FIG. 1) and the resulting tape speed is displayed on the meter 73 (see FIG. 1). The portion of the electrical circuitry that accomplishes this speed control and monitoring is shown in FIG. 12 wherein the capstan motor 31 is schematically depicted with motor field 75 and motor armature 76. The speed display meter 73 is also shown schematically. Motor speed is controlled by varying motor armature input V by the speed control knob 74 (see FIG. 1). The electrical means for varying voltage V is common knowledge and is not shown or described. The motor field 75 is excited by a voltage regulated source which means is also common knowledge and will not be described. The speed display meter 73 is what is commonly known as a D.C. ammeter whose scale deflection is proportional to the electrical current flowing through it.

The following will demonstrate that the meter 73 may be used to monitor the motor speed.

Let:

R=motor armature resistance (ohms)

$R_s$=series resistance in armature circuit (ohms) which is made much smaller than R $R_1$, $R_2$, $R_m$=speed monitoring circuit resistors (ohms). $R_m$ is made much greater than $R_2$ and $R_2$ is much greater than $R_s$ V=the armature input voltage (volts)

I=armature current (amperes)

$I_m$=meter current (amperes)

$s$=shaft speed (r.p.m.)

$k$, K=constants $\phi$=field flux (oersteds)

$\phi Ks$=motor back E.M.F. (volts)

$V_r$=voltage drop across $R_2$ (volts)

For the circuit described, if the Wheatstone bridge formed by $R_1$, $R_2$, R and $R_s$ is balanced, i.e., $$R_s/R=R_2/R_1=k \tag{1}$$

the meter current and meter reading will be directly proportional to shaft speed regardless of the actual shaft speed, armature voltage or motor load. The following mathematical derivation is proof.

From motor fundamentals:

$$I=\frac{V-\phi KS}{R+R_s} \tag{2}$$

and under the conditions defined $$I_m=\frac{Vr-IR_s}{R_m} \tag{3}$$

but, $$V_r=\frac{VR_2}{R_1+R_2}=V\left(\frac{1}{\frac{R_1}{R_2}+1}\right)=V\left(\frac{K}{1+K}\right) \tag{4}$$

from Equation 2

$$IR_s=\left(\frac{V-\phi KS}{R+R_s}\right)(R_s)=(V-\phi KS)\left(\frac{K}{1+K}\right) \tag{5}$$

Using Equations 4 and 5 in Equation 3

$$I_m=\frac{1}{R_m}\left[V\left(\frac{K}{1+K}\right)-(V-\phi KS)\left(\frac{K}{1+K}\right)\right] \tag{6}$$

Simplifying Equation 6 yields $$I_m=\left(\frac{K}{1+K}\right)\left(\frac{\phi KS}{R_m}\right) \tag{7}$$

The monitor current, $I_m$, is directly proportional to $s$, shaft speed. All of the other factors are constants. The reason for using a regulated field voltage is obvious from Equation 7—$I_m$ is also proportional to field flux. In practice, we find it desirable to regulate the field and armature voltages for greater speed stability. We also find it desirable to operate the field winding in saturation—a practice which further decreases the possibility of field flux ($\phi$) change as a result of line voltage variations.

While in the foregoing specification a detailed description of an embodiment of the invention has been put down for the purpose of illustration, many variations in the details herein given may be made by those skilled in the art.

We claim:

1. In a mechanism having means for transporting an endless tape in a preselected loop path past a tape head, means for controlling tension in the tape comprising:

driven porous tape translating means frictionally engaging said tape in said path at a point subsequent to said head;

porous tape retarding means frictionally engaging said tape at a point in said path prior to said head; and a single vacuum pump means providing a fluid pressure differential across each of said porous means including means for adjustably decreasing the fluid pressure across one of said porous means relative to the fluid pressure across the other of said porous means to provide coordinated translating and retarding forces controlling the tension in the tape as it is transported past said head.

2. The mechanism of claim 1 wherein the area of engagement of said tape with said translating porous means is substantially similar to the area of engagement of said tape with said retarding means.

3. The mechanism of claim 1 further including means for rotatably accurately mounting any one of a plurality of different roller guides adjacent said head for guiding any one of a number of correspondingly different width tapes into preselected accurate alignment with said head.

4. The mechanism of claim 1 further including prong means for removing snarls from said tape prior to said retarding means.

5. The mechanism of claim 1 wherein said mechanism includes a direct current motor driving said translating means, an ammeter, and means for causing said ammeter to indicate a current directly proportional to the speed of said motor.

6. The mechanism of claim 5 wherein said translating means comprises a rotatable capstan.

References Cited

UNITED STATES PATENTS

| | | | |
|---|---|---|---|
| 2,943,860 | 7/1960 | D'Arcy | 179—100.2 |
| 2,984,398 | 5/1961 | Chalmers | 226—95 |
| 3,048,315 | 8/1962 | Pankratz | 226—196 |
| 3,072,311 | 1/1963 | Cohen | 226—196 |
| 3,097,779 | 7/1963 | Rock | 226—196 |
| 3,110,431 | 11/1963 | Potter | 226—95 |
| 3,273,774 | 9/1966 | Hansen | 226—195 |

FOREIGN PATENTS 470,123 Great Britain.

RICHARD E. AEGERTER, *Primary Examiner.*

HARVEY C. HORNSBY, *Assistant Examiner.*

U.S. Cl. X.R.

226—195, 196; 179—100.2